United States Patent [19]

Stockinger et al.

[11] Patent Number: 4,883,845
[45] Date of Patent: Nov. 28, 1989

[54] CURABLE COMPOSITION OF POLYETHER SULFONE OR POLYETHER KETONE COPOLYMER AND UNSATURATED IMIDE

[75] Inventors: Friedrich Stockinger, Courtepin; Werner Stauffer, Fribourg, both of Switzerland

[73] Assignee: Ciba-Geigy Corporation, Ardsley, N.Y.

[21] Appl. No.: 299,294

[22] Filed: Jan. 23, 1989

[30] Foreign Application Priority Data

Feb. 1, 1988 [CH] Switzerland ............... 336/88

[51] Int. Cl.$^4$ ............................................. C08G 65/48
[52] U.S. Cl. ..................... 525/534; 524/611; 525/471; 525/535; 525/539; 528/125; 528/170; 528/171; 528/174; 528/192
[58] Field of Search ............... 525/471, 534, 535, 539; 528/170, 171, 174, 192, 125

[56] References Cited

U.S. PATENT DOCUMENTS 4,634,742 1/1987 Percec ............................... 525/390

Primary Examiner—Harold D. Anderson
Assistant Examiner—T. Mosley
Attorney, Agent, or Firm—Stephen V. O'Brien

[57] ABSTRACT

The invention relates to curable compositions comprising (a) a copolyether resin having end groups —OR$^1$ linked direct to phenyl nuclei and containing 1 to 50 mol % of repeating structural units of formula I

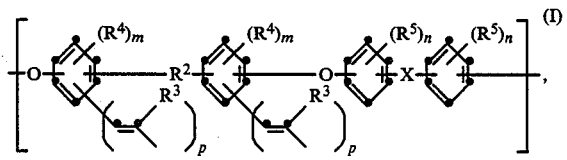

and 99 to 50 mol % of repeating structural units of formula II

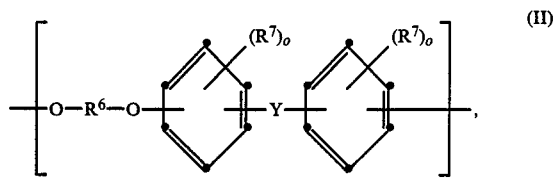

wherein R$^1$ is hydrogen, a phenylene radical substituted by amino agroups or ethylenically unsaturated radicals or is a 2,3-epoxypropyl radical, R$^2$ is a direct C—C bond or a group of formula —C$_r$H$_{2r}$—, —O—, —S—, —CO— or —SO$_2$—, r is 1 to 20, R$^3$ is hydrogen or methyl, R$^4$, R$^5$ and R$^7$ are inert substituents, m, n and o are each independently 0, 1 or 2, p is 1 or 2, R$^6$ is a radical of a bisphenol, X and Y are —SO$_2$— or —CO—, and (b) at least one compound of formula VIII, IX or X

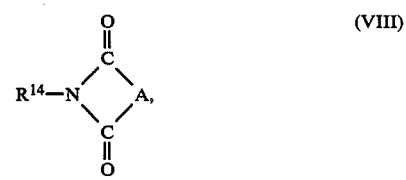

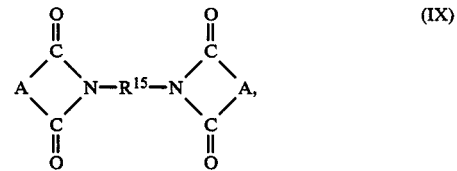

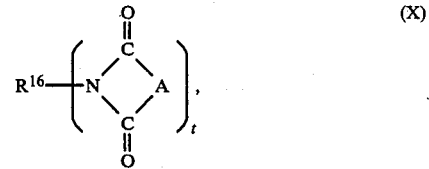

wherein A forms a maleimidyl, nadicimidyl, allylnadicimidyl or methallylnadicimidyl system, and R$^{14}$ and R$^{15}$ are mono- or divalent alipahtic, cycloaliphatic, aromatic or heterocyclic radicals, and R$^{16}$ and an aromatic radical of valency t and t is an integer from 3 to 12.

The compounds can be used as matrix resins for the preparation of fibrous composite structures.

10 Claims, No Drawings

CURABLE COMPOSITION OF POLYETHER SULFONE OR POLYETHER KETONE COPOLYMER AND UNSATURATED IMIDE

The present invention relates to novel curable compositions and to the cured products obtainable therefrom.

Aside from their known technical advantages, polyether resins—like other thermoplastics—suffer from the drawbacks of a pronounced tendency to creep under load at elevated temperature and also of an insufficient resistance to organic solvents.

There has been no lack of attempts to remedy these shortcomings by end-capping polyether polymers with reactive end groups that effect crosslinking. Such end groups are the maleimidyl, nadicimidyl or ethynyl groups disclosed, for example, in European patent application No. A-67 976.

Polyarylene ethers which contain at least two ethenyl or ethynyl groups in the polymer backbone and additionally contain end groups of this type are disclosed in U.S. Pat. No. 4 634 742.

It has now been found that mixtures of specific copolyether sulfones or copolyether ketones and of specific unsaturated imides can be processed to cured products which combine desirable thermoplastic properties such as high impact strength and flexural strength, and desirable properties of thermoset resins such as high glass transition temperatures and good resistance to solvents.

The present invention specifically relates to curable compositions comprising (a) a copolyether resin having end groups —OR$^1$ linked direct to phenyl nuclei and containing 1 to 50 mol% of repeating structural units of formula I

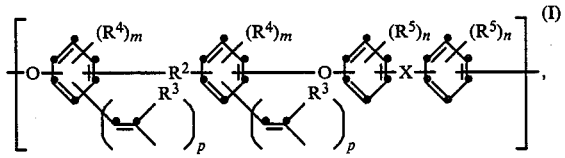

and 99 to 50 mol% of repeating structural units of formula II

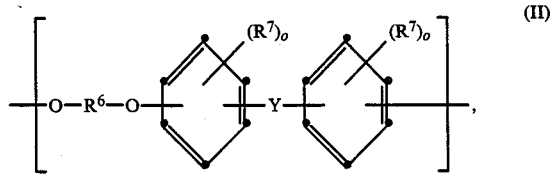

the percentages being based in each case on the total number of repeating structural units in each molecule, in which end groups —OR$^1$ or formulae I and II above R$^1$ is hydrogen or a radical of formulae III to VI

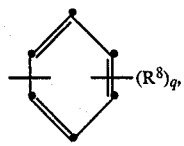

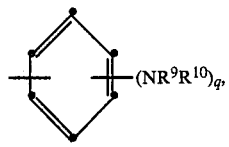

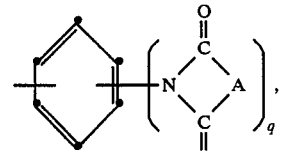

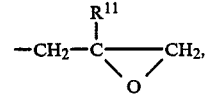

R$^2$ is a direct C—C bond or a group of formula —C$_r$H$_{2r}$—, —O—, —S—, —CO— or —SO$_2$—, r is 1 to 20, R$^3$ is hydrogen or methyl, R$^4$, R$^5$ and R$^7$ are each independently of one another C$_1$–C$_4$alkyl, C$_1$–C$_4$alkoxy or chloro or bromo, m, n and o are each independently of one another 0, 1 or 2, p is 1 or 2, R$^6$ is a divalent radical of a bisphenol after removal of both phenolic hydroxyl groups, which radical is unsubstituted or substituted by one or two C$_1$–C$_4$alkyl or C$_1$–C$_4$alkoxy groups or chlorine or bromine atoms, X and Y are each independently of the other —CO— or —SO$_2$—, R$^8$ is vinyl, ethynyl, allyl, methallyl, prop-1-enyl or 2-methylprop-1-enyl, R$^9$ and R$^{10}$ are each independently of the other hydrogen, allyl or methallyl, R$^{11}$ is hydrogen or methyl, q is 1 or 2, A is a group of formula VIIa or VIIb $$-CH=CH-, \quad \text{(VIIa)}$$

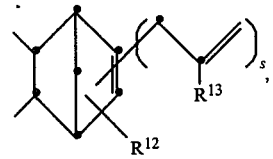

wherein

R$^{12}$ and R$^{13}$ are each independently of the other hydrogen or methyl, and s is 0, 1 or 2, and (b) at least one compound of formula VIII, IX or X

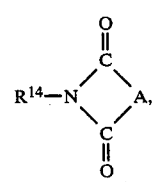

-continued

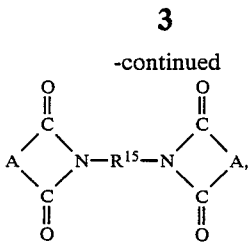
(IX)

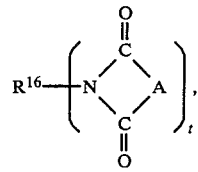
(X)

wherein
A is as defined above,
t is an integer from 3 to 12,
$R^{14}$ is $C_1$–$C_{20}$alkyl, $C_5$–$C_{12}$cycloalkyl, $C_6$–$C_{18}$aryl, $C_7$–$C_{20}$aralkyl or a $C_4$–$C_{18}$heterocycle containing one or two N, S or O atoms, $R^{15}$ is $C_2$–$C_{50}$alkylene, $C_5$–$C_{12}$cycloalkylene, $C_6$–$C_{18}$arylene, $C_7$–$C_{20}$aralkylene or a divalent $C_4$–$C_{18}$heterocyclic radical containing one or two
N, O or S atoms, and
$R^{16}$ is a radical of valency t of an aromatic polyamine after removal of the t amino groups.

$R^1$ is preferably hydrogen or a radical of formula IV, wherein $R^9$ and $R^{10}$ are each hydrogen and q is 1.

The indices p and q are preferably 1 and the index r is preferably 1 to 6, most preferably 1.

$R^2$ is preferably —$CH_2$—, —$C(CH_3)_2$—, —O— or —S—, $R^3$ is preferably hydrogen.

The radicals —CH=C($R^3$)—$CH_3$ in formula I are preferably each in ortho-position to the respective phenolic O atom.

$R^4$, $R^5$ and $R^7$ as $C_1$–$C_4$alkyl are in straight-chain or branched-chain configuration and are, for example, methyl, ethyl, n-propyl, isopropyl or n-butyl. Methyl is preferred.

$R^4$, $R^5$ and $R^7$ as $C_1$–$C_4$alkoxy are in straight-chain or branched chain configuration and are, for example, methoxy, ethoxy, n-propoxy, isopropoxy or n-butoxy. Methoxy is preferred.

The indices m, n and o are preferably 0.

$R^6$ as divalent radical of a bisphenol is typically the divalent radical of a mononuclear or polynuclear carbocyclic-aromatic phenol, preferably the radical of a mononuclear or binuclear carbocyclic-aromatic phenol, both aromatic nuclei of which are fused or linked to each other through a bridging group.

Preferred radicals $R^6$ are those of formulae XI to XIII

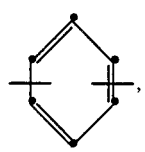
(XI)

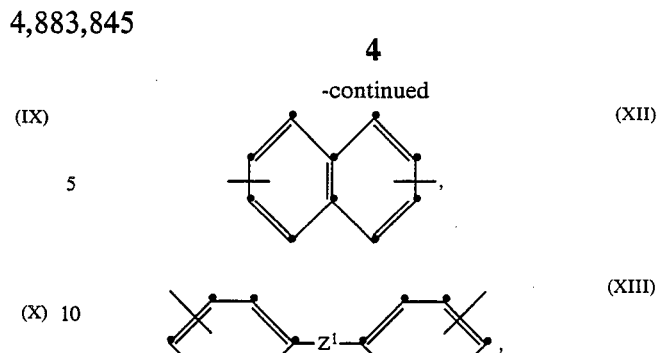
(XII)

(XIII)

wherein $Z^1$ is a direct C—C bond or a group of formula —$C_rH_{2r}$—, wherein r is as defined above, —O—, —S—, —$SO_2$—, —CO—, —$C(CF_3)_2$—, —$CH(C_6H_5)$—, —P(O)$R^{17}$ or a group of formula XIV or XV

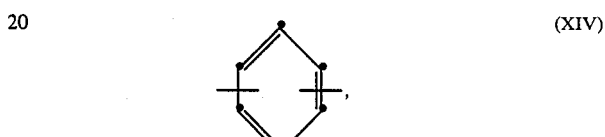
(XIV)

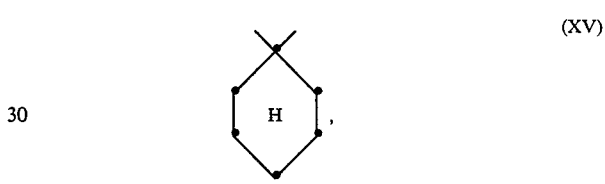
(XV)

and $R^{17}$ is methyl, cyclohexyl or phenyl.

Particularly preferred radicals $R^6$ are those of formulae XI and XIII, wherein $Z^1$ is a direct C—C bond or a group of formula —$CH_2$—, —$CHCH_3$—, —$C(CH_3)_2$—, —$CH(C_2H_5)$—, —$C(CH_3)(C_2H_5)$—, —O—, —S— or —P(O)$R^{17}$—.

X and Y preferably have the same meaning.

$R^8$ is preferably allyl, methallyl, prop-1-enyl or 2-methylprop-1-enyl, most preferably allyl or methallyl.

$R^9$ and $R^{10}$ are preferably hydrogen.

$R^{11}$ is preferably hydrogen.

A is preferably a radical of formula VIIa or a radical of formula VIIb, wherein s is 1.

$R^{12}$ and $R^{13}$ are preferably hydrogen and s is preferably 1 or 2, most preferably 1.

$R^{14}$ as $C_1$–$C_{20}$alkyl is straight-chain or branched. Straight-chain radicals are preferred. Examples of such radicals $R^{14}$ are methyl, ethyl, n-propyl, isopropyl, n-butyl, sec-butyl, pentyl, hexyl, heptyl, octyl, nonyl, 2-ethylhexyl, decyl, undecyl, dodecyl, tetradecyl, hexadecyl, octadecyl or eicosyl. Preferably $R^{14}$ is $C_1$–$C_6$alkyl.

$R^{14}$ as $C_5$–$C_{12}$cycloalkyl is, for example, cyclopentyl, cyclohexyl, cycloheptyl, cyclooctyl or cyclododecyl. The preferred meaning is cyclohexyl.

$R^{14}$ as $C_6$–$C_{18}$aryl is a mononuclear to trinuclear carbocyclic-aromatic radical which may carry one or more inert substituents such as alkyl or alkoxy. Polynuclear radicals may be condensed or linked to one another through a bridging group. Examples of bridging groups are those defined above for $Z^1$.

Representative of $R^{14}$ as a $C_4$–$C_{18}$heterocycle containing one or two N, S or O atoms are 5- or 6-membered non-aromatic or, preferably aromatic, groups which preferably consist of one or two heterocyclic systems linked to each other through a bridging group as defined for $Z^1$. Preferred heterocycles are 5-membered mononuclear aromatic groups containing one O or S atom in the ring, for example furyl or thienyl, or 6-membered non-aromatic N-heterocyclic radicals such as pyrrolidinyl, imidazolidinyl, pyrazolidinyl, piperidyl, piperazinyl, morpholinyl or hydantoinidyl.

$R^{14}$ is preferably cyclohexyl or $C_6$–$C_{18}$aryl. Most preferably, $R^{14}$ is a radical of formula XVII to XIX

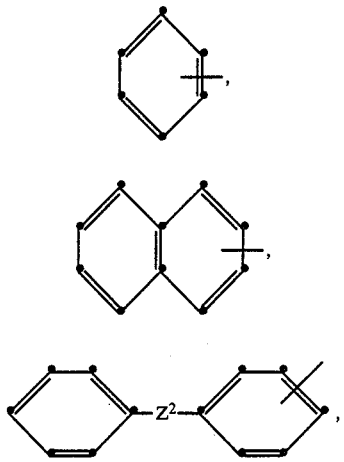

wherein $Z^2$ has one of the meanings given above for $Z^1$.

$R^{15}$ as $C_2$–$C_{50}$alkylene is typically a straight-chain alkylene radical.

Examples of such alkylene radicals are ethylene, trimethylene, tetramethylene, pentamethylene, hexamethylene, heptamethylene, octamethylene, nonamethylene, decamethylene, undecamethylene, dodecamethylene, tetradecamethylene, hexadecamethylene, octadecamethylene or eicosamethylene. $C_2$–$C_{20}$Alkylene radicals are preferred.

$R^{15}$ as $C_5$–$C_{12}$cycloalkylene is typically cyclopentylene, cyclohexylene, cycloheptylene, cyclooctylene or cyclododecylene. Cyclohexylene is preferred. The cycloalkylene radicals may also be alkyl-substituted or they form part of an aliphatic chain. Exemplary thereof is the radical of isophoronediamine.

$R^{15}$ as $C_6$–$C_{18}$arylene is typically a mono- to trinuclear carbocyclic-aromatic radical which may carry one or more inert substituents such as alkyl or alkoxy. Polynuclear radicals may be condensed or linked to one another through a bridging group as defined above for $Z^1$.

$R^{15}$ as a divalent $C_4$–$C_{18}$heterocyclic radical containing one or two N, S or O atoms is a divalent group which is derived from a heterocycle as defined above for $R^{14}$.

$R^{15}$ is preferably $C_2$–$C_6$alkylene or $C_6$–$C_{18}$arylene and is most preferably a radical of formula XI to XIII as already defined above for $R^6$, or is a radical of formula XX

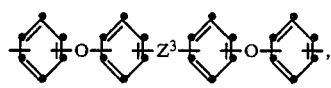

wherein $Z^3$ has the meaning as defined above for $Z^1$. Imidyl compounds containing these radicals are disclosed in European patent application No. A 32 745.

$R^{16}$ is preferably a radical of formula XXI

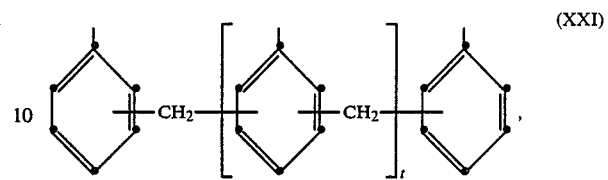

wherein $t$ is 1 to 10.

Preferred curable compositions are those in which m, n and o are 0 and p and q are 1.

Other preferred curable compositions are those in which $R^{12}$ and $R^{13}$ are hydrogen and s is 1.

Still more preferred curable compositions are those in which X and Y each have the same meaning.

Particularly preferred curable compositions are those in which $R^1$ is hydrogen or a group of formula III to V.

Among these last mentioned compositions, that embodiment is especially preferred in which $R^1$ is hydrogen or a group of formula IV, q is 1, and $R^9$ and $R^{10}$ are hydrogen.

Particularly preferred curable compositions are those wherein component (a) consists of 2 to 30 mol%, more particularly 5 to 20 mol%, of repeating structural units of formula I, and 98 to 70 mol%, preferably 95 to 80 mol%, of repeating structural units of formula II, and having an average molecular weight (number average) of 2000 to 30,000, preferably from 5000 to 20,000.

Of very particular interest are curable compositions in which component (b) is a compound of formula VIII or formula IX or a mixture of such compounds, $R^{14}$ is $C_5$–$C_7$cycloalkyl or $C_6$–$C_{18}$aryl, and $R^{15}$ is $C_6$–$C_{18}$arylene.

Among these last mentioned compositions, those curable compositions are preferred wherein $R^{14}$ is cyclohexyl or phenyl and $R^{15}$ is a radical of the above defined formula XIII, wherein $Z^1$ is a direct C—C bond, —CH$_2$—, —C(CH$_3$)$_2$—, —C(CF)$_2$—, —O—, —S—, —SO$_2$— or —CO—.

The polymers of component (a) having hydroxyl end groups can be obtained by reacting compounds of formulae XXII and/or XXIII and compounds of formulae XXIV to XXVI in a polar aprotic solvent and in the presence of a base:

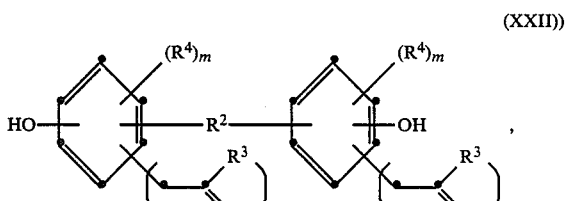

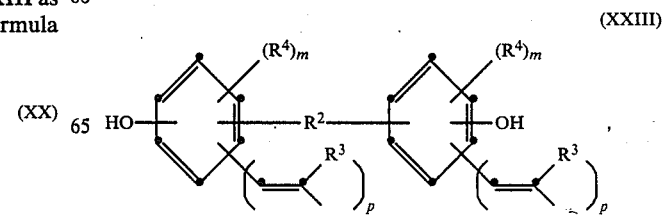

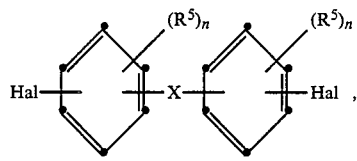 (XXIV)

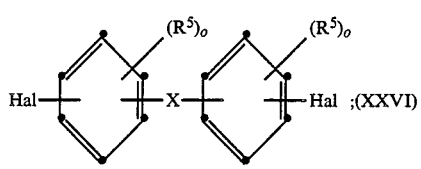 (XXV)

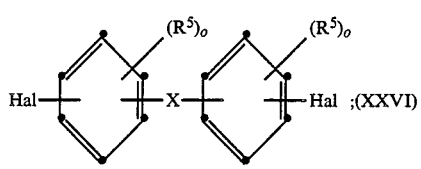 (XXVI)

in which formulae above $R^2$ to $R^7$, X and Y and the indices m, n, o and p are as previously defined and Hal is a fluorine, chlorine, bromine or iodine atom, preferably a chlorine atom in the sulfones and a fluorine atom in the ketones.

If a compound of formula XXII is used, then isomerisation takes place during the reaction to give the appropriate 1-propenyl derivative. To prepare the hydroxyl-terminated copolyether resins ($R^1$=hydrogen), the ratios of the bisphenols to the dihalo compounds are to be chosen in a manner known per se such that the bisphenol components are present in a small excess of stoichiometric proportion. The molar ratio of compounds XXII/XXIV or XXIII/XXIV to the compounds XXV/XXVI is normally 1:99 to 1:1.

However, the dihalo compounds can also be used in a small excess of stoichiometric proportion and the halogen-terminated copolyether resins so obtained subsequently modified by reaction with an alkali metal hydroxide such as aqueous sodium hydroxide.

The solvent will normally be a polar aprotic compound, for example dimethyl formamide or dimethylacetamide.

A suitable base is preferably an inorganic base such as NaOH, KOH or $K_2CO_3$.

The reaction of the bisphenols with the aromatic dihalo compounds to polyarylene ethers is known per se and described, for example, in European patent application No. A-106 023.

If it is desired to prepare end-capped copolyether resins ($R^1 \neq$hydrogen), then these are conveniently prepared by carrying out a one step reaction. This reaction is described, for example, in the above mentioned European patent application No. A-67 976.

The reaction is carried out by charging the reactor with the appropriate dihalo compounds of formulae XXIV and XXVI in a small excess of stoichiometric proportion together with the bisphenols of formulae XXII and/or XXIII and XXV, and reacting these simultaneously with monophenols of formulae XXVII to XXIX,

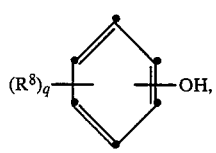 (XXVII)

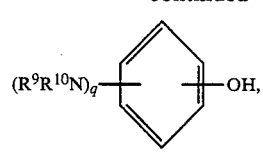 (XXVIII)

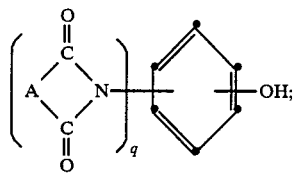 (XXIX)

wherein $R^8$ to $R^{10}$ and A as well as the index q are as previously defined above, so that the dihalo-terminated polymers so obtained can be end-capped with said monophenols.

Glycidyl-terminated polymer components (a) are obtained in a manner known per se by reacting the appropriate hydroxyl-terminated polymers with epichlorohydrin or with β-methylepichlorohydrin in the presence of a base.

The intermediates of formulae XXII to XXVI are known per se or can be prepared by methods which are known per se.

Thus the 1-propenyl derivatives of formula XXIII can be prepared from the appropriate (meth)allyl derivatives of formula XXII by isomerisation in the presence of alkali. Examples of such reactions will be found in European patent application No. A-14 816.

The (meth)allyl derivatives of formula XXII can be obtained from the appropriate (meth)allyl ethers of the bisphenols by Claisen rearrangement. Examples of such reactions will also be found in European patent application No. A-14 816.

Some of the bisphenols of formula XXV and the dihalo compounds of formulae XXIV and XXVI are commercially available. These compounds are already known as components for synthesising polyarylene ethers and are disclosed, for example, in European patent application No. A-106 023.

The functionalised monophenols of formulae XXVII to XXIX are also known per se.

The compounds of formula XXVIII, wherein at least one of $R^9$ and $R^{10}$ is allyl or methallyl, can be obtained, for example, by reacting allyl or methallyl chloride with the corresponding aminophenols. The preparation of compounds of the formula XXIX type is described, for example, in European patent application No. A-67 976.

The compounds of formulae VIII to X are also known per se and some are commercially available.

The maleimidyl compounds of formulae VIII to X can be prepared, for example, by methods analogous to those described in U.S. Pat. No. 3 522 271. Maleimidyl compounds of formula X are described, for example, in German Offenlegungsschrift No. 2 230 874.

The corresponding bicyclo[2.2.1]hept-5-ene-2,3-dicarboximide derivatives, or the allyl- or methallyl-substituted derivatives of this type, can be obtained by methods analogous to those employed for preparing the maleimidyl compounds by using the appropriate bicyclo[2.2.1]hept-5-ene-2,3-dicarboxylic anhydrides instead of maleic anhydride. Compounds of this type are disclosed, for example, in U.S. Pat. No. 4 515 962.

A particular advantage of the curable compositions of this invention resides in the feature that they may be used and processed in the conventional manner for thermoplastics, and that, after curing, they exhibit the characteristic properties of thermoset resins, such as good strength and high glass transition temperatures.

In general the curable compositions contain 1–99% by weight, preferably 60–95% by weight, of component (a) and 99–1% by weight, preferably 40–5% by weight, of component (b). The percentages being based on the total weight of components (a) and (b).

The curable compositions can be used, for example as moulding or coating compounds or for making films. Prior to processing, conventional modifiers such as fillers, pigments, stabilisers or reinforcing agents, for example carbon, boron or glass fibres, can be added to the polyether resins obtained in the form of moulding powders, melts, or solutions in a customary organic solvent. The curable compositions can also be processed together with other thermoplastics such as polyesters, polyamides, polyimides, polyolefins or polyurethanes, in particular with the conventional polyether resins.

The curable compositions of the present invention are preferably employed as matrix resins for the preparation of fibrous composite structures employing, as reinforcement fibres, the fibres conventionally used for reinforcing moulding materials. These fibres may be organic or inorganic fibres, natural fibres or synthetic fibres, as for example aramide fibres, and may be in the form of bundles or continuous filaments. Exemplary of reinforcement fibres employed are glass, asbestos, boron, carbon and metal fibres, with carbon and metal fibres being preferred. Such fibres and fabrics made therefrom are commercially available.

The invention thus also relates to the use of the curable compositions as matrix resins for the preparation of composite fibrous structures.

The invention further relates to the crosslinked products obtainable by heating or by irradiating the curable compositions of the invention with actinic radiation.

As mentioned at the outset, the curable compositions can be crosslinked to products having advantageous properties. If the compositions are heat crosslinked, this heat crosslinking may be effected in the presence of oxygen or, after previous oxidation, by treatment with oxygen, also under anaerobic conditions, e.g. in a laminating press.

The temperature for the heat crosslinking is normally in the range from 220°–350° C., preferably from 250°–300° C.

The heat crosslinking can, if desired, be carried out in the presence of radical formers, e.g. inorganic or organic peroxides such as potassium peroxide sulfate or benzoyl peroxide, azo compounds such as azoisobutyronitrile, organic hydroperoxides such as cumene hydroperoxide or tert-butyl hydroperoxide, α-haloacetophenone, benzoin or ethers thereof, benzophenone, benzpinacol, benzil acetals, anthraquinones, arsines, phosphines, thioureas, redox initiator systems, anaerobic initiator systems or metal salts.

In general the radical former is used in a quantity of 0.1–5% by weight, preferably 0.5–3% by weight, based on the weight of components (a) and (b).

Crosslinking of the curable compositions of the invention by actinic radiation can be effected, for example, with X-rays, accelerated electrons, with γ-rays emitted from a $^{60}$Co source, or with UV rays.

The invention is illustrated by the following Examples.

(A) PREPARATION OF THE POLYMER COMPONENTS

Example A1

A 6 liter sulfonating flask fitted with propeller mixer, thermometer, water separator, intensive condenser and gas inlet pipe is charged with 439.9 g (1.532 mol) of 4,4'-dichlorodiphenylsulfone, 297.2 g (1.302 mol) of 2,2-bis(4-hydroxyphenyl)propane, 94.4 g (0.306 mol) of 2,2-bis(3-allyl-4-hydroxyphenyl)propane, 254.3 g (1.84 mol) of anhydrous pulverised potassium carbonate, 2.5 l of dimethylacetamide and 1 l of xylene, and the mixture is reacted for 2 hours at 146° C. while continuously removing the water of reaction as an azeotrope. Then solvent is distilled off until the temperature of the reaction mixture is 150° C. The reaction mixture is thereafter kept for 20 hours at this temperature and solvent is once more subsequently removed by distillation until the temperature of the mixture has risen to 157° C. After a further 65 minutes, 2 l of dimethylacetamide are added, the reaction mixture is cooled to room temperature and then charged into 15 l of water to precipitate the reaction product, while stirring intensively with a turbine impeller. The precipitate is filtered with suction, washed thoroughly with water and dried under vacuum at 100° C., to give 713.8 g (99.1% of theory) of a colourless powder which dissolves in methylene chloride to form a clear solution.

| Analytical data | | |
|---|---|---|
| gel chromatography | $M_n = 6954$; $M_w = 30082$; $M_w/M_n = 4.32$ | |
| glass transition temperature ($T_g$ onset, TMA) | 115° C. | |
| elemental analysis | calculated 6.82% S | found 6.79% S. |

Example A2

In accordance with the procedure of Example A1, 458.38 g (1.596 mol) of 4,4'-dichlorodiphenylsulfone, 260.22 g (1.14 mol) of 2,2-bis(4-hydroxyphenyl)propane, 164.42 g (0.532 mol) of 2,2-bis(3-allyl-4-hydroxyphenyl)propane, 254.0 g (1.84 mol) of anhydrous pulverised potassium carbonate, 2.5 l of dimethylacetamide and 1 l of xylene are reacted and worked up as described in Example A1). Yield: 750.2 g (97.9% of theory) of a colourless polysulfone which dissolves in methylene chloride to form a clear solution.

| Analytical data | | |
|---|---|---|
| gel chromatography | $M_n = 7395$; $M_w = 36393$; $M_w/M_n = 4.92$ | |
| glass transition temperature ($T_g$ onset, TMA) | 107° C. | |
| elemental analyis | calculated 6.5% S | found 6.68% S. |

(B) USE EXAMPLES

Example B1

100 g of polysulfone (prepared according to Example A1) and 15 g of bis(4-maleimidylphenyl)methane are homogenised for 10 minutes in an automatic mortar (®Pulverisette). About 10 g of the powder so obtained are applied to an eloxated aluminium sheet, which is then pressed at 200° C. for 2 minutes in a laboratory press to a 0.5 mm thin sheet. Quarters of this sheet are each polymerised for 6 hours at 250° C., for 6 hours at 280° C. and for 6 hours at 310° C. The properties of the polymer are reported in Table 1.

Example B2

100 g of polysulfone (prepared according to Example A2) and 25 g of bis(4-maleimidylphenyl)methane are processed and polymerised as described in Example B1. The properties of the polymer are reported in Table 1.

TABLE 1

The glass transition temperatures of the polymers are determined by thermomechanical analysis (TMA) using a Mettler TA-3000, and the solvent resistance is determined in methylene chloride.

| Example | Test | Curing | 2 min. 200° C. | 6 h 250° C. | 6 h 280° C. | 6 h 310° C. |
|---|---|---|---|---|---|---|
| B1 | $T_g^1$ onset | [TMA, °C.] | 115 | 182 | 189 | 192 |
| | $T_g^1$ | [TMA, °C.] | 124 | 187 | 194 | 202 |
| | aspect | | yellowish | reddish | reddish-brown | dark |
| | resistance in methylene chloride after 10 days | | dissolved | swelled | insoluble | insoluble |
| B2 | $T_g^1$ onset | [TMA, °C.] | 107 | 197 | 194 | 202 |
| | $T_g^1$ | [TMA, °C.] | 114 | 212 | 208[1] | 215[1] |
| | aspect | | yellowish | reddish | reddish-brown | dark |
| | resistance in methylene chloride after 10 days | | dissolved | slightly swelled | insoluble | insoluble |

[1] $T_g$ determination by TMA: recording the penetration depth of a detecting element as function of the sample temperature.
$T_g$ value = minimum of the 1st derivation of the curve.
$T_g$ onset value = point of intersection of the extended base line with the tangent at the calibration curve in the area of the steepest ascent.

What is claimed is:
1. A curable composition comprising
(a) a copolyether resin having end groups —OR[1] linked direct to phenyl nuclei and containing 1 to 50 mol% of repeating structural units of formula I

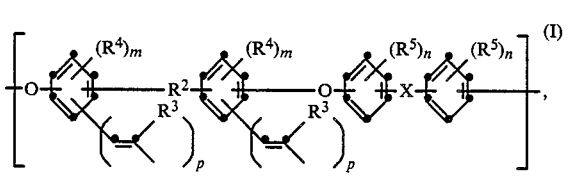

and 99 to 50 mol% of repeating structural units of formula II

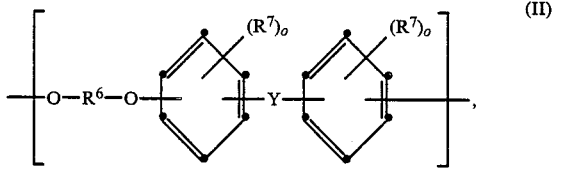

the percentages being based in each case on the total number of repeating structural units in each molecule, in which end groups —OR[1] or formulae I and II above
R[1] is hydrogen or a radical of formulae III to VI

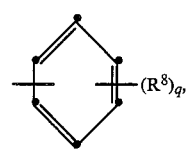

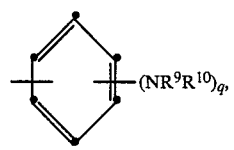

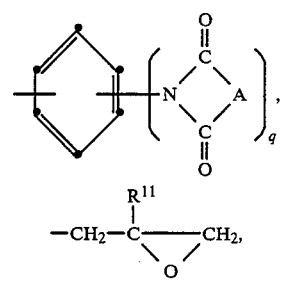

$R^2$ is a direct C—C bond or a group of formula —$C_rH_{2r}$—, —O—, —S—, —CO— or —$SO_2$—,
r is 1 to 20,
$R^3$ is hydrogen or methyl,
$R^4$, $R^5$ and $R^7$ are each independently of one another $C_1$-$C_4$alkyl, $C_1$-$C_4$alkoxy or chloro or bromo,
m, n and o are each independently of one another 0, 1 or 2,
p is 1 or 2,
$R^6$ is a divalent radical of a bisphenol after removal of both phenolic hydroxyl groups, which radical is unsubstituted or substituted by one or two $C_1$-$C_4$alkyl or $C_1$-$C_4$alkoxy groups or chlorine or bromine atoms,
X and Y are each independently of the other —CO— or —$SO_2$—,
$R^8$ is vinyl, ethynyl, allyl, methallyl, prop-1-enyl or 2-methylprop-1-enyl,
$R^9$ and $R^{10}$ are each independently of the other hydrogen, allyl or methallyl,
$R^{11}$ is hydrogen or methyl, q is 1 or 2,
A is a group of formula VIIa or VIIb $$-CH=CH-, \quad (VIIa)$$

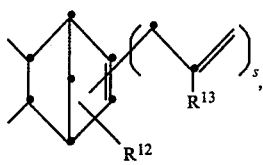 (VIIb)

wherein
$R^{12}$ and $R^{13}$ are each independently of the other hydrogen or methyl, and
s is 0, 1 or 2, and
(b) at least one compound of formula VIII, IX or X

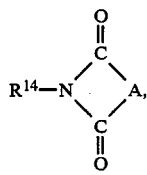 (VIII)

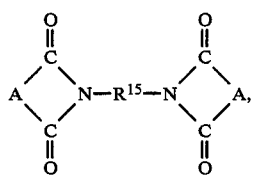 (IX)

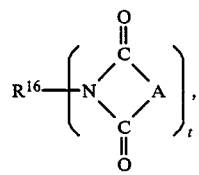 (X)

wherein
A is as defined above,
t is an integer from 3 to 12,
$R^{14}$ is $C_1-C_{20}$alkyl, $C_5-C_{12}$cycloalkyl, $C_6-C_{18}$aryl, $C_7-C_{20}$-aralkyl or a $C_4-C_{18}$heterocycle containing one or two N, S or O atoms,
$R^{15}$ is $C_2-C_{50}$alkylene, $C_5-C_{12}$cycloalkylene, $C_6-C_{18}$arylene, $C_7-C_{20}$aralkylene or a divalent $C_4-C_{18}$heterocyclic radical containing one or two N, O or S atoms, and
$R^{16}$ is a radical of valency t of an aromatic polyamine after removal of the t amino groups.

2. A curable composition according to claim 1, wherein m, n and o is 0 and p and q are 1.

3. A curable composition according to claim 1, wherein $R^{12}$ and $R^{13}$ are hydrogen and s is 1.

4. A curable composition according to claim 1, wherein X and Y each have the same meaning.

5. A curable composition according to claim 1, wherein $R^1$ is hydrogen or a group of formulae III to V.

6. A curable composition according to claim 5, wherein $R^1$ is hydrogen or a group of formula IV, q is 1 and $R^9$ and $R^{10}$ are hydrogen.

7. A curable composition according to claim 1, wherein component (a) consists of 2 to 30 mol% of repeating structural units of formula I and of 98 to 70 mol% of repeating structural units of formula II and has an average molecular weight (number average) of 2000 to 30,000.

8. A curable composition according to claim 1, wherein component (b) is a compound of formula VIII or formula XI or a mixture of said compounds, $R^{14}$ is $C_5-C_7$cycloalkyl or $C_6-C_{18}$aryl and $R^{15}$ is $C_6-C_{18}$arylene.

9. A curable composition according to claim 8, wherein $R^{14}$ is cyclohexyl or phenyl and $R^{15}$ is a radical of formula XIII

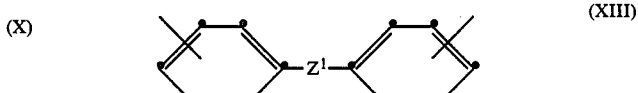 (XIII)

wherein $Z^1$ is a direct C—C bond, —$CH_2$—, —$C(CH_3)_2$—, —$C(CF_3)_2$—, —O—, —S—, —$SO_2$— or —CO—.

10. A crosslinked product obtainable by heating or by irradiating a composition as claimed in claim 1 with actinic radiation.

* * * * *